US011958222B2

(12) United States Patent
Anegawa et al.

(10) Patent No.: US 11,958,222 B2
(45) Date of Patent: Apr. 16, 2024

(54) PLASTICIZING DEVICE, INJECTION MOLDING MACHINE, AND THREE-DIMENSIONAL SHAPING APPARATUS

(71) Applicant: Seiko Epson Corporation, Tokyo (JP)

(72) Inventors: Kenta Anegawa, Matsumoto (JP); Seiichiro Yamashita, Azumino (JP); Riona Hayashi, Shiojiri (JP); Megumi Enari, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 429 days.

(21) Appl. No.: 17/102,667

(22) Filed: Nov. 24, 2020

(65) Prior Publication Data

US 2021/0154901 A1 May 27, 2021

(30) Foreign Application Priority Data

Nov. 25, 2019 (JP) ................. 2019-212100

(51) Int. Cl.
*B29C 45/54* (2006.01)
*B29C 45/53* (2006.01)
(Continued)

(52) U.S. Cl.
CPC ............ *B29C 45/54* (2013.01); *B29C 45/531* (2013.01); *B29C 45/60* (2013.01); *B29C 45/62* (2013.01);
(Continued)

(58) Field of Classification Search
CPC ..... B29C 45/464; B29C 48/361; B29C 48/47; B29C 64/314; B29C 64/321;
(Continued)

(56) References Cited

U.S. PATENT DOCUMENTS

2007/0184146 A1* 8/2007 Takeuchi ................ B29C 45/53
425/589
2020/0198233 A1* 6/2020 Yang ..................... B29C 64/245

FOREIGN PATENT DOCUMENTS

CN 103252885 * 8/2013
JP H04-073124 A 3/1992
(Continued)

OTHER PUBLICATIONS

JPH11198200 machine translation (Year: 1999).*
CN103252885 machine translation (Year: 2013).*

*Primary Examiner* — Arrie L Reuther
*Assistant Examiner* — Alexander A Wang
(74) *Attorney, Agent, or Firm* — Harness, Dickey & Pierce, P.L.C.

(57) ABSTRACT

A plasticizing device that plasticizes a solid material includes a drive motor, a screw rotated by the drive motor along a rotation axis of the drive motor and having a groove forming surface on which a groove is formed, a barrel having a facing surface facing the groove forming surface and provided with a communication hole in a central portion thereof, and a heating unit configured to heat at least one of the screw and the barrel. A first facing region and a second facing region that is closer to the central portion than the first facing region are provided between the groove forming surface and the facing surface. A second gap between the groove forming surface and the facing surface in the second facing region is larger than a first gap between the groove forming surface and the facing surface in the first facing region.

11 Claims, 11 Drawing Sheets

(51) Int. Cl.
    *B29C 45/60*     (2006.01)
    *B29C 45/62*     (2006.01)
    *B29C 45/74*     (2006.01)
    *B29C 64/209*     (2017.01)
    *B29C 64/295*     (2017.01)
    *B29C 64/329*     (2017.01)
    *B33Y 30/00*     (2015.01)

(52) U.S. Cl.
    CPC ............ *B29C 45/74* (2013.01); *B29C 64/209* (2017.08); *B29C 64/295* (2017.08); *B29C 64/329* (2017.08); *B33Y 30/00* (2014.12)

(58) Field of Classification Search
    CPC ....... B29C 64/209; B29C 45/46; B29C 45/47; B29C 45/48; B29C 2045/533; B29C 45/54; B29C 45/541; B29C 45/542; B29C 45/547; B29C 45/548
    See application file for complete search history.

(56) References Cited

FOREIGN PATENT DOCUMENTS

| | | | |
|---|---|---|---|
| JP | H11198200 | * | 7/1999 |
| JP | 2009-137260 A | | 6/2009 |
| JP | 2009-269182 A | | 11/2009 |
| JP | 2010-241016 A | | 10/2010 |
| JP | 2018-118431 A | | 8/2018 |

* cited by examiner

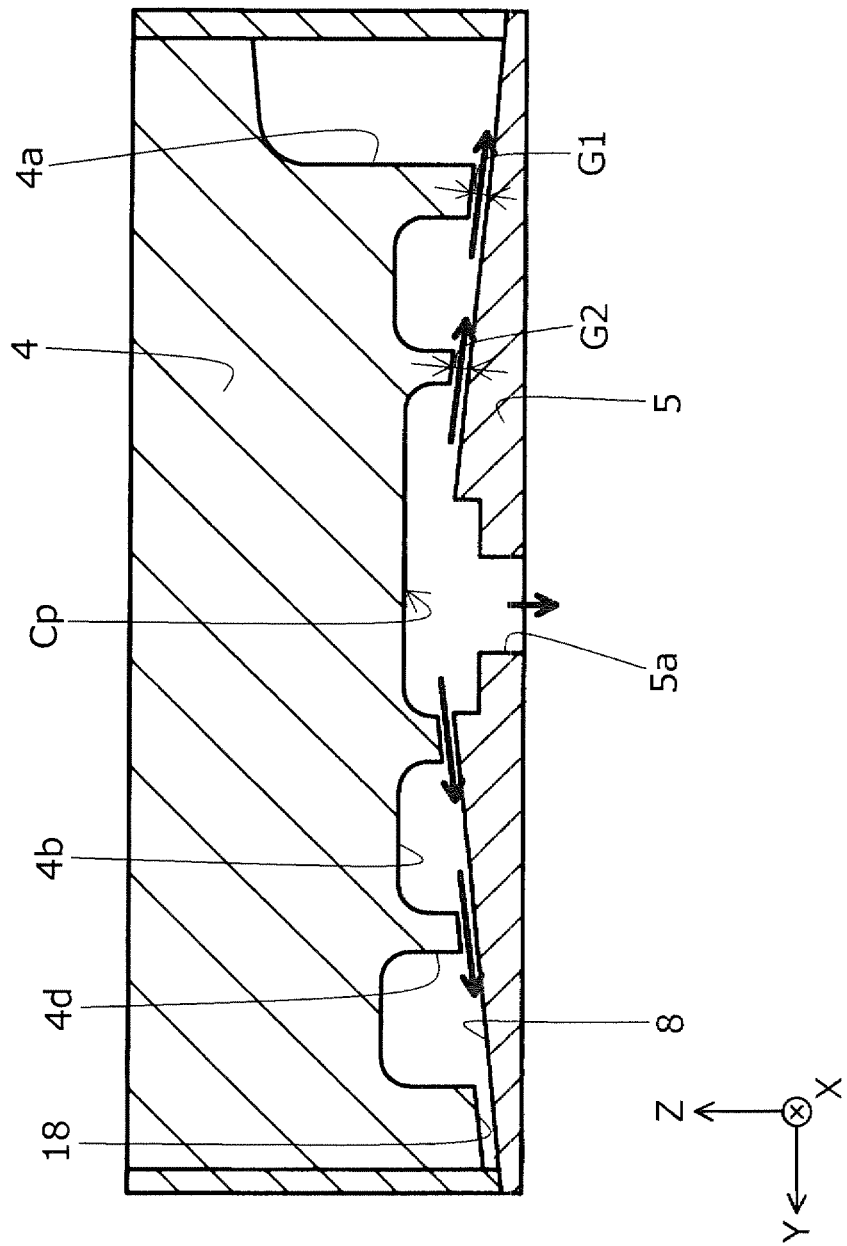

PLASTICIZING DEVICE, INJECTION MOLDING MACHINE, AND THREE-DIMENSIONAL SHAPING APPARATUS

The present application is based on, and claims priority from JP Application Serial Number 2019-212100, filed Nov. 25, 2019, the disclosure of which is hereby incorporated by reference herein in its entirety.

BACKGROUND

1. Technical Field

The present disclosure relates to a plasticizing device, an injection molding machine, and a three-dimensional shaping apparatus.

2. Related Art

In the related art, various plasticizing devices that plasticize a solid material are used. Among these, a plasticizing device is included, which plasticizes a material while moving the material by rotating a screw (a so-called flat screw) that faces a barrel and that has a substantially flat groove forming surface on which a spiral groove is formed. For example, JP-A-2010-241016 discloses a plasticizing feeder that includes a rotor (flat screw) on which a spiral groove is formed, and a barrel that is provided with a communication hole in a central portion thereof and is provided at a position in contact with an end surface of the rotor.

However, the material may flow backward in a plasticizing device including a flat screw in the related art, such as the flat screw disclosed in JP-A-2010-241016. When the material flows backward, a capacity of supplying the material to the communication hole is reduced. For example, when the plasticizing device is used in an injection molding machine or a three-dimensional shaping apparatus, a supply of the material may be poor.

SUMMARY

An object of the present disclosure is to prevent a material from flowing backward in a plasticizing device that moves the material by rotating a flat screw that faces a barrel and on which a spiral groove is formed.

In order to attain the object described above, a plasticizing device that plasticizes a solid material according to the present disclosure includes a drive motor, a screw rotated along a rotation axis of the drive motor and having a groove forming surface on which a groove is formed, a barrel having a facing surface facing the groove forming surface and provided with a communication hole in a central portion thereof, and a heating unit configured to heat at least one of the screw and the barrel. A first facing region and a second facing region that is closer to the central portion than the first facing region are provided between the groove forming surface and the facing surface. A second gap that is a gap between the groove forming surface and the facing surface in the second facing region is larger than a first gap that is a gap between the groove forming surface and the facing surface in the first facing region.

BRIEF DESCRIPTION OF THE DRAWINGS

FIG. 11 is a schematic front view showing a screw and a barrel of a three-dimensional shaping apparatus according to a reference example.

DESCRIPTION OF EXEMPLARY EMBODIMENTS

Figure 1:
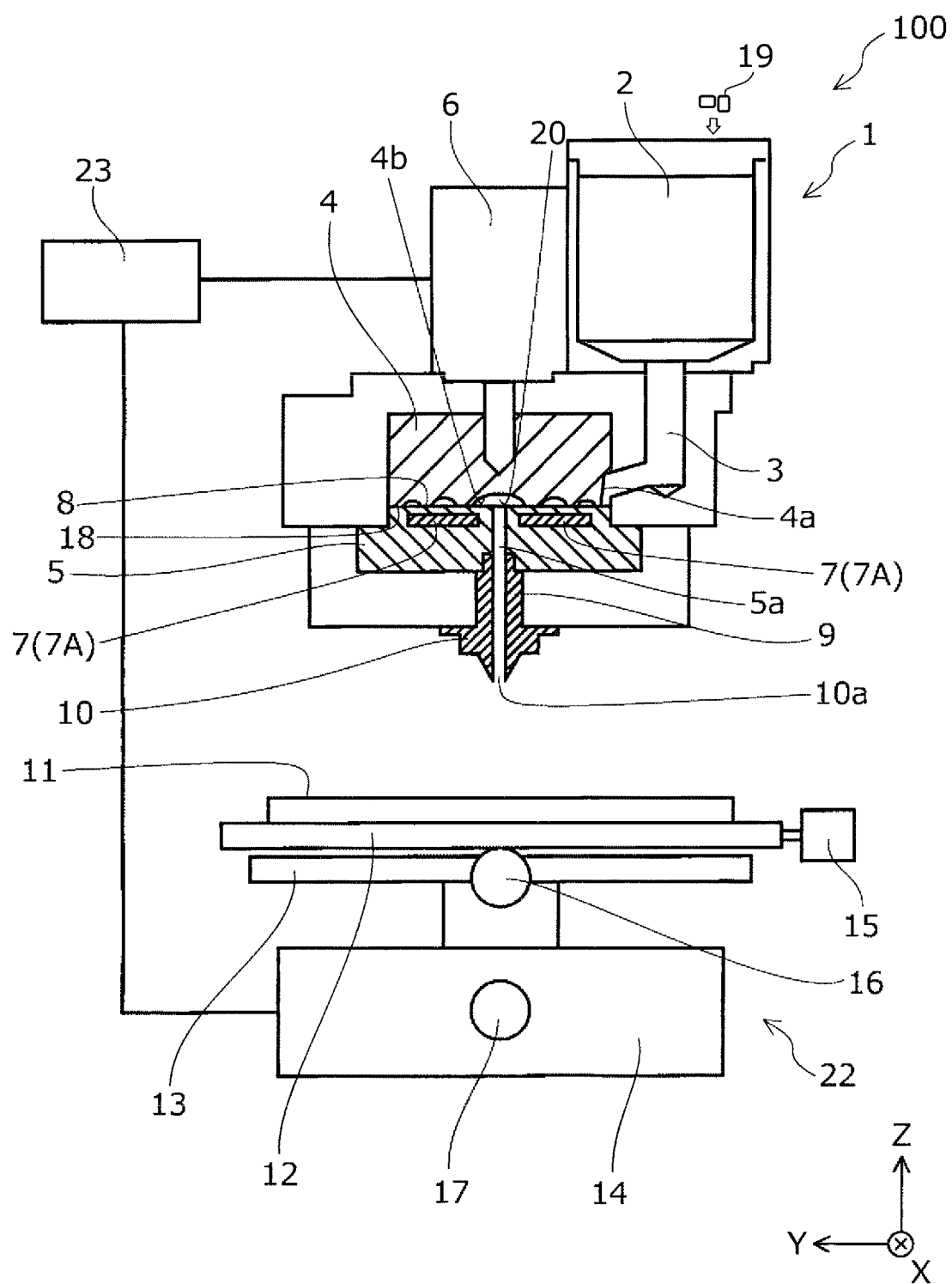
FIG. 1 is a schematic front view showing a configuration of a three-dimensional shaping apparatus according to a first embodiment of the present disclosure.

First, the present disclosure will be briefly described.

In order to solve the problem described above, according to a first aspect of the present disclosure, a plasticizing device that plasticizes a solid material is provided. The plasticizing device includes a drive motor, a screw rotated along a rotation axis of the drive motor and having a groove forming surface on which a groove is formed, a barrel having a facing surface facing the groove forming surface and provided with a communication hole in a central portion thereof, and a heating unit configured to heat at least one of the screw and the barrel. A first facing region and a second facing region that is closer to the central portion than the first facing region are provided between the groove forming surface and the facing surface. A second gap that is a gap between the groove forming surface and the facing surface in the second facing region is larger than a first gap that is a gap between the groove forming surface and the facing surface in the first facing region.

According to the first aspect, provided between the groove forming surface and the facing surface are the first facing region and the second facing region that is provided at a position closer to a central portion side than a position of the first facing region and in which a gap between the groove forming surface and the facing surface is larger than that in the first facing region. In this manner, by providing the second facing region in which the gap between the groove forming surface and the facing surface is large at a position close to the central portion where the communication hole is provided, a material can be easily concentrated from the first facing region to the second facing region, and the material can be prevented from flowing backward from a second facing region side to a first facing region side.

According to a second aspect of the present disclosure, in the plasticizing device according to the first aspect, the second gap becomes large toward the central portion, and in a cross section along a rotation axis direction that is a direction in which the rotation axis extends, at least one of the groove forming surface and the facing surface corresponding to the first facing region is inclined at a first angle with respect to an intersecting direction intersecting perpendicularly with the rotation axis direction, at least one of the groove forming surface and the facing surface corresponding to the second facing region is inclined at a second angle with respect to the intersecting direction, and the first angle and the second angle are different angles.

According to the second aspect, since the gap between the groove forming surface and the facing surface in the second facing region becomes large toward the central portion side, in the second facing region, the material is easily concentrated toward the central portion where the communication hole is provided. Therefore, the material can be prevented from flowing backward in the second facing region.

According to a third aspect of the present disclosure, in the plasticizing device according to the second aspect, the second angle is larger than 0° and is 5° or less.

According to the third aspect, an inclination angle in the second facing region is 5° or less, so that the second gap can be prevented from becoming too large. When the second gap is too large, convection may occur in the second facing region, causing the material to flow backward. When the second gap is prevented from becoming too large, a backflow of the material caused by the occurrence of the convection in the second facing region can be prevented.

According to a fourth aspect of the present disclosure, in the plasticizing device according to the second aspect, a boundary between the first facing region and the second facing region in the intersecting direction is at a position satisfies a relationship indicated by the following expression (1)

$$1/3 \leq Lb/La \leq 1/2.5 \tag{1}$$

(La represents a linear distance from an outer end portion of the groove forming surface or the facing surface to a rotation center of the rotation axis in the intersecting direction, and Lb represents a linear distance from the outer end portion to the boundary in the intersecting direction).

According to the fourth aspect, a ratio of the linear distance from the outer end portion where the screw and the barrel face each other in the intersecting direction to a boundary portion between the first facing region and the second facing region with respect to the linear distance from the outer end portion where the screw and the barrel face each other in the intersecting direction to the rotation center of the screw is 1/3 or more and 1/2.5 or less. When the ratio is too large, it may be difficult to concentrate the material from the first facing region to the second facing region, and when the ratio is too small, it may be difficult to concentrate the material toward the central portion in the second facing region. However, such adverse effects can be prevented by setting the ratio to 1/3 or more and 1/2.5 or less.

According to a fifth aspect of the present disclosure, in the plasticizing device according to the second aspect, the facing surface has a first facing surface located in the first facing region and a second facing surface located in the second facing region, and the first facing surface is inclined at the first angle and the second facing surface is inclined at the second angle.

According to the fifth aspect, the first facing surface and the second facing surface are formed on the facing surface, so that the first facing region and the second facing region can be formed.

According to a sixth aspect of the present disclosure, in the plasticizing device according to the fifth aspect, in the cross section along the rotation axis direction, the first facing surface is an inclined surface on which the first gap becomes small toward the central portion side, and the second facing surface is an inclined surface on which the second gap becomes large toward the central portion side.

According to the sixth aspect, the first facing surface is an inclined surface on which the first gap becomes small toward the central portion side. In a general screw, a groove becomes shallow toward a central portion side, that is, a rib forming the groove becomes lower toward the central portion side, so that a central portion is recessed with respect to an outer side. Therefore, on the first facing surface, the gap between the groove forming surface and the facing surface is narrower, that is, the gap is prevented from becoming too large as compared with the general screw, so that a backflow of the material caused by the occurrence of the convection can be prevented.

According to a seventh aspect of the present disclosure, in the plasticizing device according to the second aspect, the groove forming surface has a first groove forming surface located in the first facing region and a second groove forming surface located in the second facing region, the first groove forming surface is inclined at the first angle, and the second groove forming surface is inclined at the second angle.

According to the seventh aspect, the first groove forming surface and the second groove forming surface are formed on the groove forming surface, so that the first facing region and the second facing region can be formed.

According to an eighth aspect of the present disclosure, in the plasticizing device according to the first aspect, the groove forming surface includes a protruding portion that protrudes toward the communication hole of the barrel.

According to the eighth aspect, a protrusion is provided in the central portion of the screw, so that the material can be efficiently supplied to the communication hole.

According to a ninth aspect of the present disclosure, in the plasticizing device according to the first aspect, the heating unit is a circular heating unit provided at a position overlapping the second facing region in a cross section perpendicular to the direction in which the rotation axis extends.

According to the ninth aspect, since the heating unit has a circular shape and is provided at the position overlapping the second facing region, the material can be efficiently heated and plasticized.

An injection molding machine according to a tenth aspect of the present disclosure includes the plasticizing device according to the first aspect, and an injection unit configured to inject a material plasticized by the plasticizing device into a mold.

According to the tenth aspect, the material can be prevented from flowing backward and the plasticized material can be injected from the injection unit.

A three-dimensional shaping apparatus according to an eleventh aspect of the present disclosure includes the plasticizing device according to the first aspect, and a discharge unit configured to discharge a material plasticized by the plasticizing device toward a table to shape a three-dimensional shaped object on the table.

According to the eleventh aspect, the material can be prevented from flowing backward and a three-dimensional shaped object can be shaped.

Hereinafter, embodiments of the present disclosure will be described with reference to the accompanying drawings. The following drawings are all schematic diagrams, and a part of components are omitted or simplified. In the drawings, an X axis direction is a horizontal direction, a Y axis direction is a horizontal direction and is a direction orthogonal to the X axis direction, and a Z axis direction is a vertical direction.

First Embodiment

First, an overall configuration of a three-dimensional shaping apparatus 100 according to a first embodiment including a plasticizing device 1 according to the first embodiment of the present disclosure will be described with reference to FIGS. 1 to 7. "Three-dimensional shaping" in the specification refers to formation of a so-called three-dimensional shaped object, and includes, for example, formation of a shape having a thickness even in a so-called two-dimensional shape such as a flat plate shape and a shape formed of, for example, one layer. "Support" means supporting from a side and supporting from an upper side depending on circumstances in addition to supporting from a lower side.

As shown in FIG. 1, the plasticizing device 1 in the three-dimensional shaping apparatus 100 according to the present embodiment includes a hopper 2 that accommodates pellets 19 serving as a solid material for forming a three-dimensional shaped object. The pellets 19 accommodated in the hopper 2 are supplied, via a supply pipe 3, to a circumferential surface 4a of a screw 4 that is a substantially cylindrical flat screw.

Figure 2:
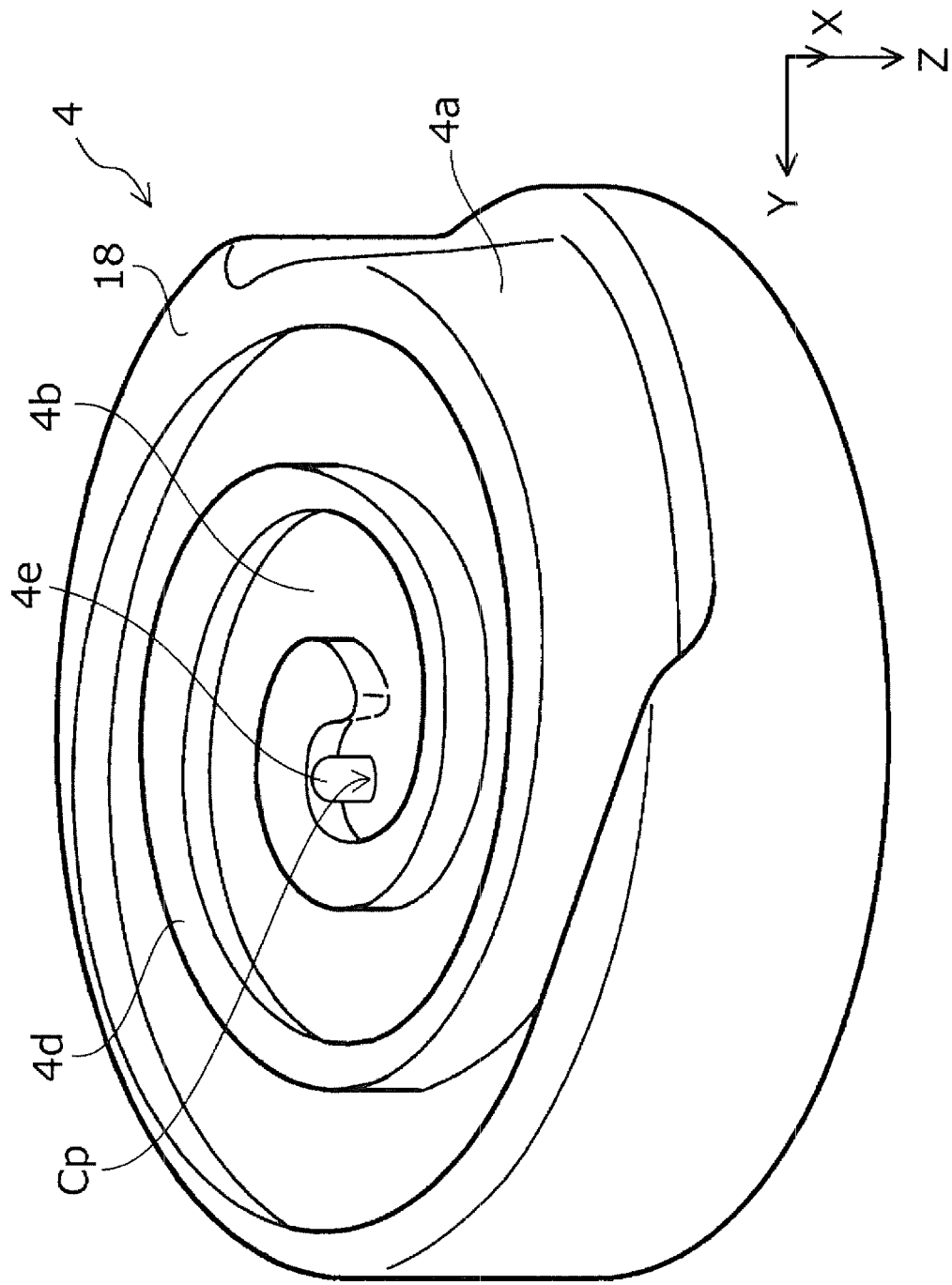
FIG. 2 is a schematic perspective view showing a screw of the three-dimensional shaping apparatus according to the first embodiment of the present disclosure.
Figure 3:
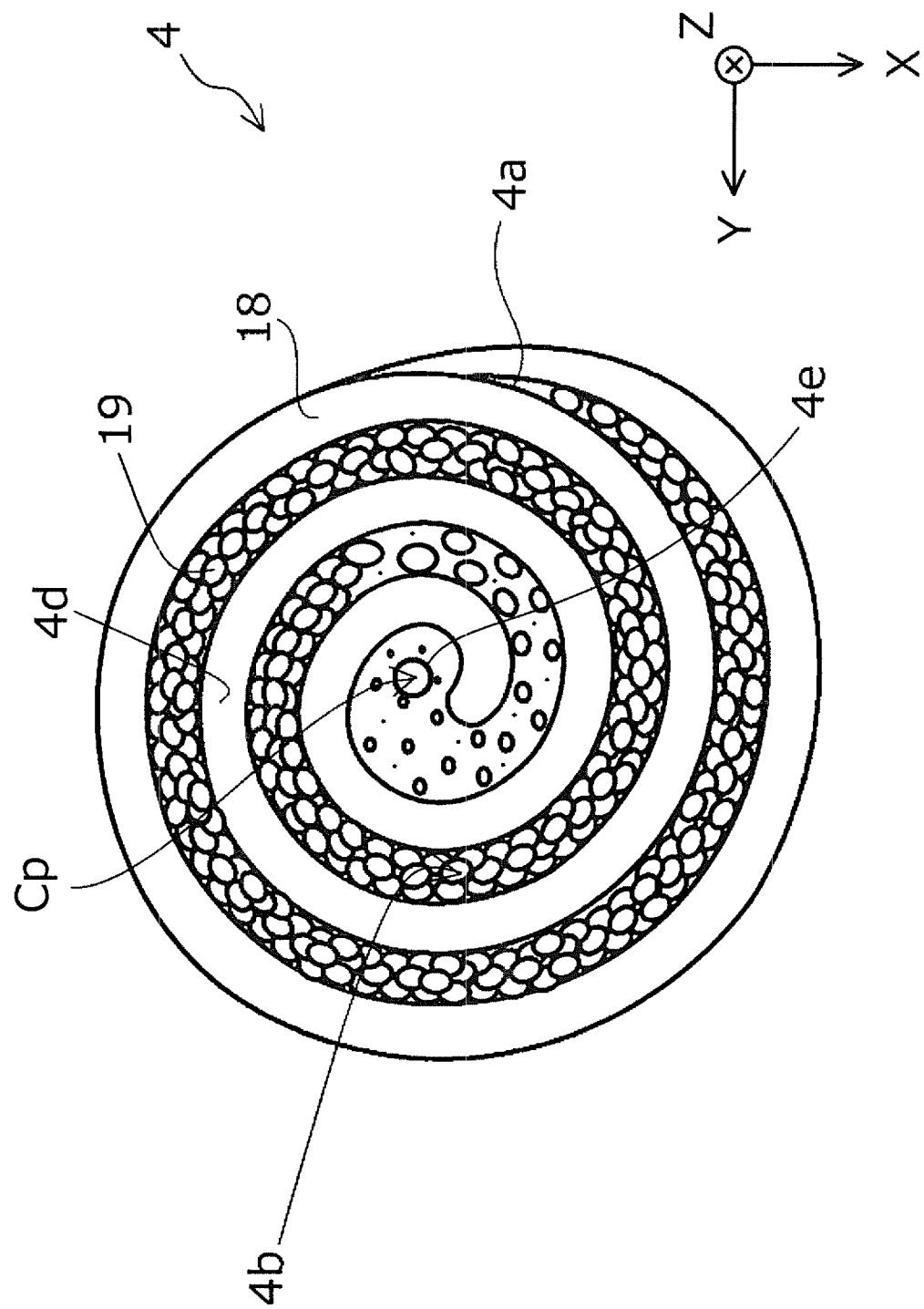
FIG. 3 is a schematic plan view showing a state in which a solid material is filled in the screw of the three-dimensional shaping apparatus according to the first embodiment of the present disclosure.

As shown in FIG. 2, a spiral groove 4b extending from the circumferential surface 4a to a central portion Cp is formed in a groove forming surface 18 that is a bottom surface of the screw 4. In other words, a rib 4d formed along with the formation of the groove 4b forms the groove forming surface 18. Since the plasticizing device 1 according to the present embodiment has such a configuration, when the screw 4 is rotated by a drive motor 6 shown in FIG. 1 with a direction along the z axis direction as a rotation axis, the pellets 19 are sent from the circumferential surface 4a to the central portion Cp, as shown in FIG. 3. Although not shown in FIG. 1, cooling water is circulated in the vicinity of the drive motor 6 in order to prevent a temperature rise of the drive motor 6. Here, the central portion Cp is a portion corresponding to a periphery of a rotation center C (see FIG. 7) of the screw 4 as viewed from the direction along the Z axis direction, and also refers to a central portion of a barrel 5 to be described later, in addition to the central portion of the screw 4.

Figure 5:
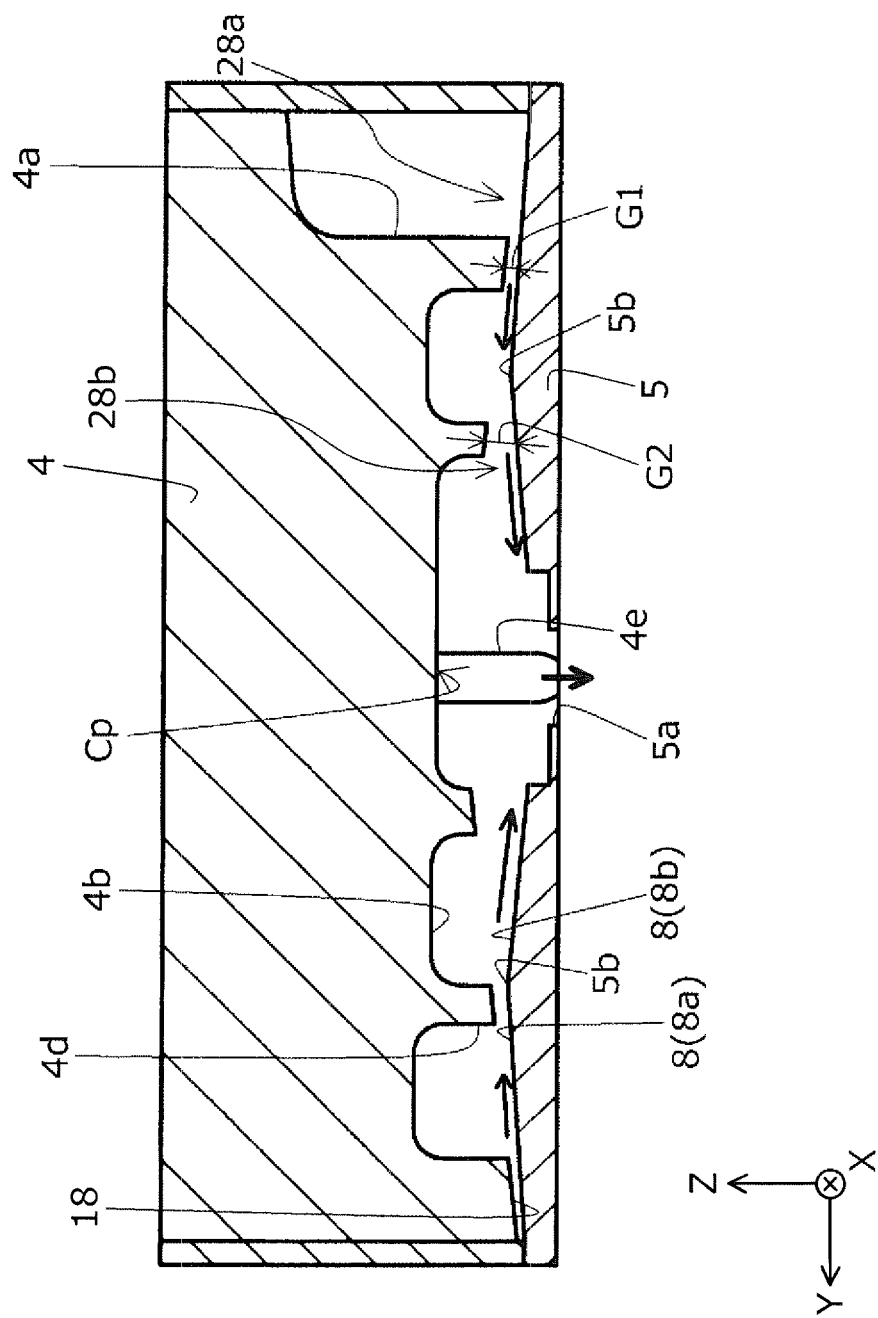
FIG. 5 is a schematic front view showing the screw and the barrel of the three-dimensional shaping apparatus according to the first embodiment of the present disclosure.

As shown in FIGS. 1 and 5, the barrel 5 is provided at a position facing the groove forming surface 18 of the screw 4 with a predetermined gap. A circular heater 7A serving as a heating unit 7 is provided in the vicinity of a facing surface 8 that is an upper surface of the barrel 5 and that faces the groove forming surface 18. With the screw 4 and the barrel 5 having such a configuration, the screw 4 is rotated to supply the pellets 19 into a space portion 20, which corresponds to a position of the groove 4b and is formed between the groove forming surface 18 of the screw 4 and the facing surface 8 of the barrel 5, and to move the pellets 19 from the circumferential surface 4a to the central portion Cp. When the pellets 19 are moved in the space portion 20 formed by the groove 4b, the pellets 19 are melted, that is, plasticized by heating of the circular heater 7A. The pellets 19 are also pressurized by pressure accompanying with the movement of the pellets 19 in the narrow space portion 20. In this manner, the pellets 19 are plasticized and supplied to a nozzle 10a via a communication hole 5a, and are injected from the nozzle 10a.

As shown in FIGS. 2, 3, and 5, a protrusion 4e is provided on the central portion Cp of the screw 4, and a part of the protrusion 4e is fitted into an upper end portion of the communication hole 5a. In other words, the screw 4 includes the protrusion 4e at the center portion Cp, and the barrel 5 includes, in the communication hole 5a, a recessed portion into which the protrusion 4e is inserted and which is at a position facing the protrusion 4e. With such a configuration, the plasticizing device 1 according to the present embodiment can efficiently supply a material obtained by plasticizing the pellets 19 into the communication hole 5a.

Here, the position of the communication hole 5a and the protrusion 4e in the horizontal direction corresponds to a position of the rotation axis of the drive motor 6. The central position of the communication hole 5a and the protrusion 4e in the horizontal direction corresponds to the rotation center C of the screw 4 shown in FIG. 7. Although the plasticizing device 1 according to the present embodiment includes the protrusion 4e, the plasticizing device 1 may not include the protrusion 4e.

As shown in FIG. 5 which is a cross-sectional view as viewed from the horizontal direction, in the screw 4 of the plasticizing device 1 according to the present embodiment, the rib 4d becomes short and the groove 4b becomes shallow in the Z axis direction toward the center portion Cp. Similar to the screw 4 of the plasticizing device 1 according to the present embodiment, a general flat screw usually has a configuration in which the groove forming surface 18 is recessed toward the central portion Cp. Therefore, in order to keep a constant gap between the groove forming surface 18 and the facing surface 8, a plasticizing device in the related art such as a three-dimensional shaping apparatus according to a reference example in FIG. 11 usually has a configuration in which the barrel 5 becomes thick toward the communication hole 5a, that is, the facing surface 8 becomes high toward the central portion Cp. However, in the plasticizing device according to the related art that is used in the three-dimensional shaping apparatus according to the reference example in FIG. 11, the material may flow backward between the groove forming surface 18 and the facing surface 8 as indicated by arrows in FIG. 11.

On the other hand, as shown in FIG. 5, in the barrel 5 of the plasticizing device 1 according to the present embodiment, a portion outside a boundary portion 5b as viewed from the horizontal direction has the same configuration as the plasticizing device according to the reference example in FIG. 11, and a portion inside the boundary portion 5b as viewed from the horizontal direction is recessed toward the communication hole 5a. In this manner, the gap is large between the groove forming surface 18 and the facing surface 8 at a position close to the central portion Cp where the communication hole 5a is provided, so that the material between the groove forming surface 18 and the facing surface 8 can be effectively supplied in a direction toward the communication hole 5a as indicated by arrows in FIG. 5, and the material can be prevented from flowing backward. The arrows in FIG. 5 and the arrows in FIG. 11 are represented by straight lines along the facing surface 8 in order to make an easy image of a moving direction of the material. Actually, the material is moved along the spiral groove 4b.

In summary here, the plasticizing device 1 according to the present embodiment is a plasticizing device that plasticizes a solid material and includes the drive motor 6, the screw 4 rotated by the drive motor 6 and having the groove forming surface 18 on which the spiral groove 4b is formed from the central portion Cp toward outside as viewed from the Z axis direction which is the rotation axis direction as the rotation axis of the drive motor 6, the barrel 5 having the facing surface 8 facing the groove forming surface 18 and provided with the communication hole 5a at a position facing the central portion Cp, and the heating unit 7 configured to heat the barrel 5. As shown in FIG. 5, a first facing region 28a and a second facing region 28b are provided between the groove forming surface 18 and the facing surface 8. In the first facing region 28a, the groove forming surface 18 and the facing surface 8 face each other with a first gap G1. The second facing region 28b is provided at a position where the groove forming surface 18 and the facing surface 8 face each other and that is closer to a central portion Cp side than the first facing region 28a. In the second facing region 28b, a second gap G2 that is a gap between the groove forming surface 18 and the facing surface 8 is larger than that in the first facing region 28a. In this manner, provided between the groove forming surface 18 and the facing surface 8 are the first facing region 28a and the second facing region 28b in which the gap between the groove forming surface 18 and the facing surface 8 is large at the position close to the central portion Cp where the communication hole 5a is provided, so that the material can be easily concentrated from the first facing region 28a to the second facing region 28b, and the material can be prevented from flowing backward from a second facing region 28b side to a first facing region 28a side. Although the heating unit 7 is configured to heat the barrel 5 in order to plasticize the solid material in the present embodiment, the heating unit 7 may be used to heat the screw 4.

Here, a configuration in which the first facing region 28a and the second facing region 28b are provided between the groove forming surface 18 and the facing surface 8 does not include a configuration in which the groove forming surface 18 and the facing surface 8 are aligned in one straight line as viewed from a plane direction (the horizontal direction) defined by the X axis and the Y axis, that is, a configuration in which there is no boundary between the first facing region 28a and the second facing region 28b. This is because the configuration in which there is no boundary between the first facing region 28a and the second facing region 28b may not efficiently move the material to the central portion Cp side. In the present embodiment, the boundary portion 5b between a first facing surface 8a and a second facing surface 8b is the boundary between the first facing region 28a and the second facing region 28b as shown in FIG. 5. Here, the "central portion Cp" can be set, for example, in a range of about one third of an outer diameter from a central position in a plan view.

Each of the first gap G1 and the second gap G2 may be an average gap between the groove forming surface 18 and the facing surface 8. Therefore, a description of the second gap G2 being larger than the first gap G1 refers to that it is sufficient if an average gap in the second facing region 28b is larger than an average gap in the first facing region 28a, and refers to that an average gap in the second facing region 28b is larger than an average gap in the first facing region 28a even in a configuration in which the groove forming surface 18 and the facing surface 8 are provided with recesses and protrusions or steps, or in a configuration in which the groove forming surface 18 and the facing surface 8 are not flat surfaces but curved surfaces. The gap between the groove forming surface 18 and the facing surface 8 may be, for example, a gap from a tip of the rib 4d of the groove forming surface 18 to the facing surface 8.

Here, as shown in FIG. 5, the second gap G2 becomes large toward the central portion Cp in the cross section along the Z axis direction. In other words, the second gap G2 becomes large toward the central portion Cp, and in a cross section along a rotation axis direction that is a direction in which the rotation axis extends, at least one of the groove forming surface 18 and the facing surface 8 corresponding to the first facing region 28a is inclined at a first angle with respect to an intersecting direction intersecting perpendicularly with the rotation axis direction, and at least one of the groove forming surface 18 and the facing surface 8 corresponding to the second facing region 28b is inclined at a second angle with respect to the intersecting direction. The first angle and the second angle are different angles. That is, as viewed from a direction along the horizontal direction, an inclination angle of the facing surface 8 corresponding to the second facing region 28b with respect to the horizontal direction is different from an inclination angle of the facing surface 8 corresponding to the first facing region 28a with respect to the horizontal direction. In this manner, an inclination angle of at least one of the groove forming surface 18 and the facing surface 8 in the second facing region 28b with respect to the horizontal direction is different from that in the first facing region 28a, and the gap between the groove forming surface 18 and the facing surface 8 in the second facing region 28b becomes large toward the central portion Cp side. Thereby, in the second facing region 28b, the material is easily concentrated toward the central portion Cp where the communication hole 5a is provided. Therefore, the material can be prevented from flowing backward in the second facing region 28b.

As shown in FIG. 5, the facing surface 8 has the first facing surface 8a located in the first facing region 28a and the second facing surface 8b that is located in the second facing region 28b and that has an angle different from the first facing surface 8a as viewed from the horizontal direction. With the plasticizing device 1 according to the present embodiment having such a configuration, the first facing region 28a and the second facing region 28b are formed. Alternatively, two surfaces having different angles as viewed from the horizontal direction may not be provided on the facing surface 8 and two surfaces having different angles as viewed from the horizontal direction may be provided on the groove forming surface 18.

As shown in FIG. 5, as viewed from the horizontal direction, the first facing surface 8a is an inclined surface at which the first gap G1 becomes small toward the central portion Cp side, and the second facing surface 8b is an inclined surface at which the second gap G2 becomes large toward the central portion Cp side. As described above, in the screw 4 according to the present embodiment, similar to the general screw, the groove 4b becomes shallow toward the central portion Cp side, that is, the rib 4d for forming the groove 4b becomes lower toward the central portion Cp side, so that the entire screw 4 is in a state in which the central portion Cp is recessed with respect to an outer side. Therefore, at the first facing surface 8a, the gap between the groove forming surface 18 and the facing surface 8 is narrowed with respect to the screw 4 in the present embodiment. That is, in the present embodiment, the gap is prevented from becoming too large, so that a backflow of the material caused by the occurrence of convection is prevented. As shown in FIG. 5, the facing surface 8 is formed into a mountain shape as viewed from the horizontal direction, so that the pellets 19 can be accumulated at an outer side of the screw 4, and an occurrence of a poor material movement caused by too early plasticization of the pellets 19 can be prevented.

Figure 4:
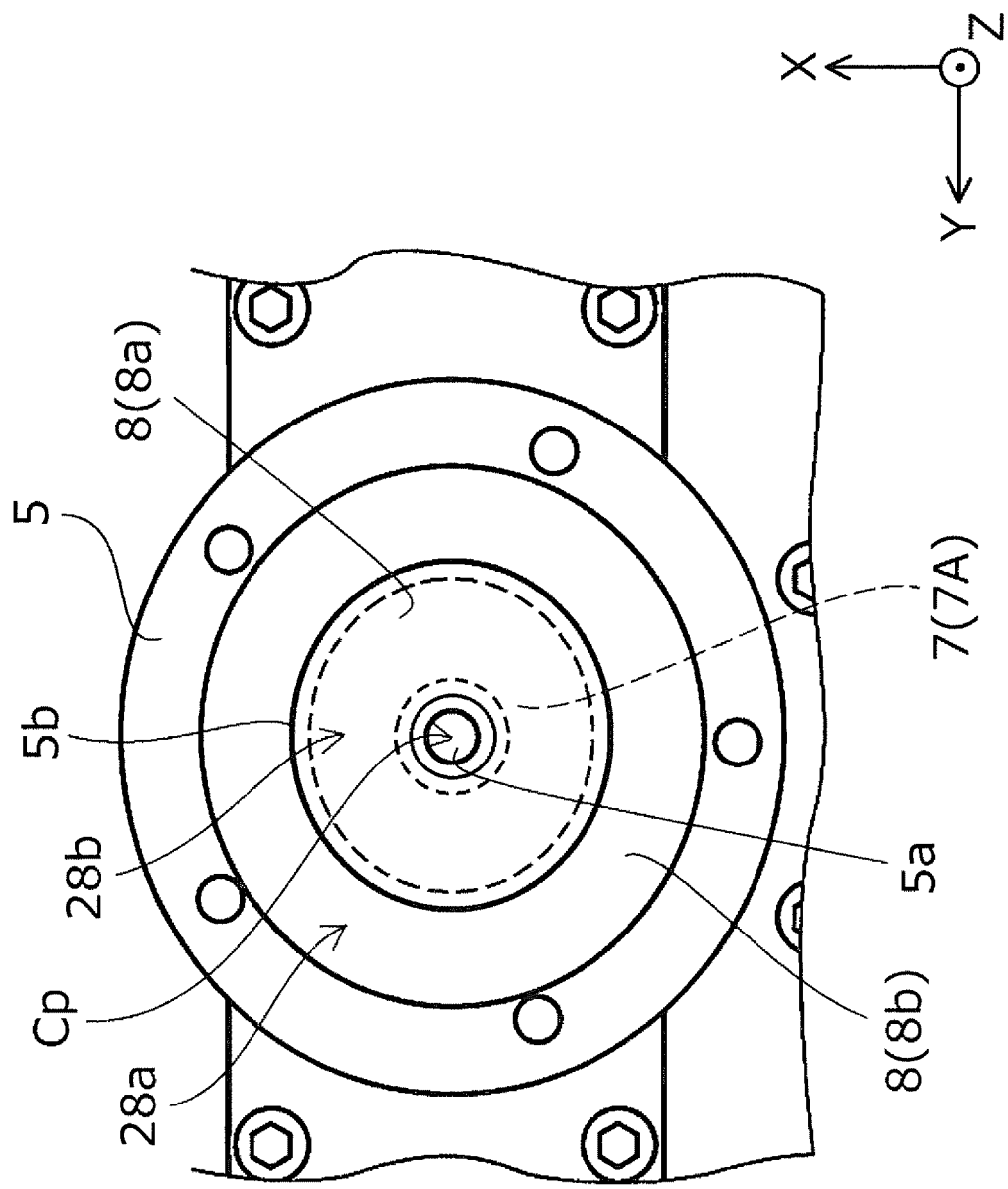
FIG. 4 is a schematic plan view showing a barrel of the three-dimensional shaping apparatus according to the first embodiment of the present disclosure.

As described above, the heating unit 7 is the circular heater 7A that is a circular heating unit, and is provided at a position overlapping the second facing region 28b as viewed from the Z axis direction as shown in FIG. 4. The heating unit 7 is provided at the position overlapping the second facing region 28b and has a circular shape, so that the material can be efficiently heated and plasticized.

As shown in FIG. 4 and the like, the communication hole 5a that is a movement path of the melted pellets 19 is formed in the central portion Cp of the barrel 5 in a plan view. As shown in FIG. 1, the communication hole 5a is continuous with the nozzle 10a of an injection unit 10 as a discharge unit that discharges the material. A filter (not shown) is provided in the communication hole 5a. Although a groove is not formed in the barrel 5 according to the present embodiment, a groove continuous with the communication hole 5a may be formed in the facing surface 8 of the barrel 5. When the groove continuous with the communication hole 5a is formed in the facing surface 8, the material may be easily gathered toward the communication hole 5a.

Figure 6:
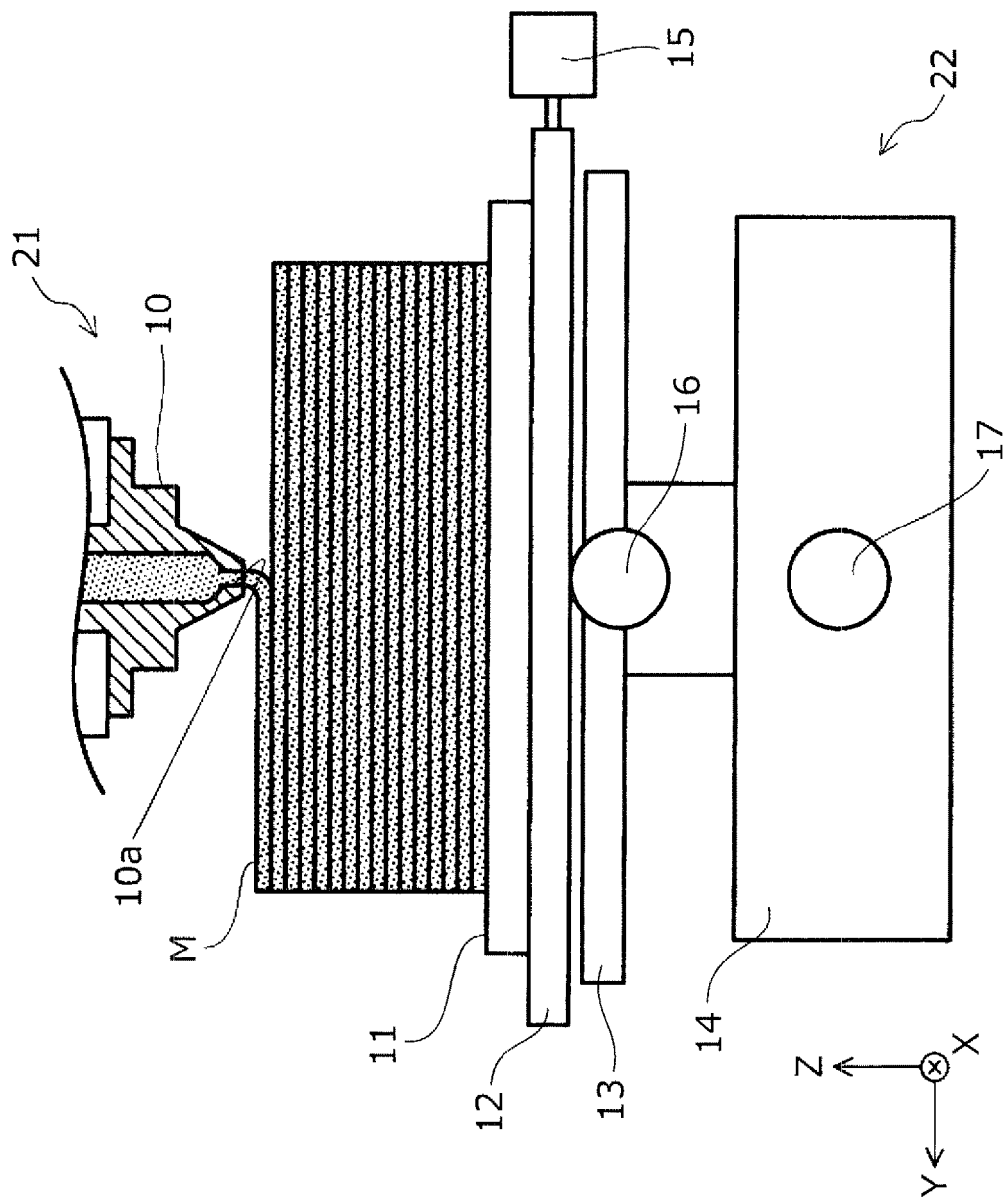
FIG. 6 is a schematic front view showing a state in which three-dimensional shaping is performed using the three-dimensional shaping apparatus according to the first embodiment of the present disclosure.

Here, the injection unit 10 can continuously inject the plasticized material in a fluid state from the nozzle 10a. As shown in FIG. 1, the injection unit 10 is provided with a heater 9 for heating the material to have a desired viscosity. The material injected from the injection unit 10 is injected into a linear shape. Then, the material is linearly injected from the injection unit 10 to form a material layer M as shown in FIG. 6.

In the three-dimensional shaping apparatus 100 according to the present embodiment, the plasticizing device 1 includes the hopper 2, the supply pipe 3, the screw 4, the barrel 5, the drive motor 6, the injection unit 10, and the like. The three-dimensional shaping apparatus 100 according to the present embodiment includes one plasticizing device 1 configured to inject a constituent material. Alternatively, the three-dimensional shaping apparatus 100 may include a plurality of plasticizing devices 1 configured to inject a constituent material, or may include a plasticizing device 1 configured to inject a support material. Here, the support material is a material for forming a support material layer used to support a constituent material layer.

As shown in FIG. 1, the three-dimensional shaping apparatus 100 according to the present embodiment includes a stage unit 22 for placing a constituent material layer formed by the material injected from the plasticizing device 1. The plasticizing device 1 and the stage unit 22 are accommodated in a constant temperature bath (not shown). The stage unit includes a plate 11 serving as a table on which the constituent material layer is actually placed. The stage unit 22 includes a first stage 12 on which the plate 11 is placed and whose position can be changed along the Y axis direction by driving a first drive unit 15. In addition, the stage unit 22 includes a second stage 13 on which the first stage 12 is placed and whose position can be changed along the X axis direction by driving a second drive unit 16. Further, the stage unit 22 includes a base portion 14 that can change a position of the second stage 13 along the Z axis direction by driving a third drive unit 17.

As shown in FIG. 1, the three-dimensional shaping apparatus 100 according to the present embodiment is electrically coupled to a control unit 23 that controls various kinds of driving of the plasticizing device 1 and various kinds of driving of the stage unit 22. Components of the plasticizing device 1 and the stage unit 22 are driven under the control of the control unit 23.

Next, a detailed configuration of the barrel 5 according to the present embodiment will be described with reference to FIG. 7. In the barrel 5 according to the present embodiment, when a length from the boundary portion 5b as a side end portion of the first facing region in a plane defined by the X axis and the Y axis to the rotation center C of the screw 4 in the second facing region 28b is defined as L1, L1 is about 36.5 mm. When a length from a first virtual connection point C1 to a second virtual connection point C2 is defined as L2, L2 is about 4 mm, in which the first virtual connection point C1 is a connection point between the first facing region 28a and the rotation center C of the screw 4 when the first facing region 28a is assumed to extend to the rotation center C of the screw 4, and the second virtual connection point C2 is a connection point between the second facing region 28b and the rotation center C of the screw 4 when the second facing region 28b is assumed to extend to the rotation center C of the screw 4. When a point where the rotation center C of the screw 4 intersects with the plane defined by the X axis and the Y axis from the boundary portion 5b is defined as C3, a distance L2a from the first virtual connection point C1 to C3 is about 1 mm, and a distance L2b from the second virtual connection point C2 to C3 is about 3 mm. An angle Θ formed between a line along the Z axis direction and passing through the rotation center C of the screw 4 and a virtual line extending from the boundary portion 5b to the second virtual connection point C2 is about 85°.

In other words, an inclination angle of the second facing surface 8b with respect to the horizontal direction is about 5° in the second facing region 28b. When the inclination angle of the second facing surface 8b with respect to the horizontal direction is set to 5° or less, the second gap G2 that is a gap between the groove forming surface 18 and the facing surface 8 in the second facing region 28b can be prevented from becoming too large. When the second gap G2 is too large, convection may occur in the second facing region 28b, causing the material to flow backward. When the second gap G2 is prevented from becoming too large, the backflow of the material caused by the occurrence of the convection in the second facing region 28b can be prevented.

L2/L1 approximates to 1/9 in the barrel 5 according to the present embodiment. It is preferable to satisfy a relationship of L2/L1<1/9 as in the barrel 5 according to the present embodiment. When a relationship of L2/L1<1/9 is satisfied, the second gap G2 that is the gap between the groove forming surface 18 and the facing surface 8 in the second facing region 28b can be prevented from becoming too large. In particular, when L2/L1 is larger than 1/5, the material may flow backward.

In the barrel 5 according to the present embodiment, when a length from the boundary portion 5b to an outer end portion in the first facing region 28a in the plane defined by the X axis and the Y axis is defined as L3, L3 is about 23.5 mm. L1/L3 approximates to 1.6 in the barrel 5 according to the present embodiment. It is preferable to satisfy a relationship of L1/L3 of 1.5 or more and 2.0 or less as in the barrel 5 according to the present embodiment. In other words, a ratio of a length of a range of the second facing region 28b to a length of a range of the first facing region 28a as viewed from the plane direction defined by the X axis and the Y axis is preferably 1.5 times or more and 2.0 times or less. This is because when the ratio is too small, it may be difficult to concentrate the material from the first facing region 28a to the second facing region 28b, when the ratio is too large, it may be difficult to concentrate the material toward the central portion Cp in the second facing region 28b, and such adverse effects can be prevented by setting the ratio to 1.5 times or more and 2.0 times or less.

In other words, the boundary portion 5b is preferably at a position satisfying a relationship indicated by the following expression (1).

$$1/3 \leq Lb/La \leq 1/2.5 \tag{1}$$

Figure 7:
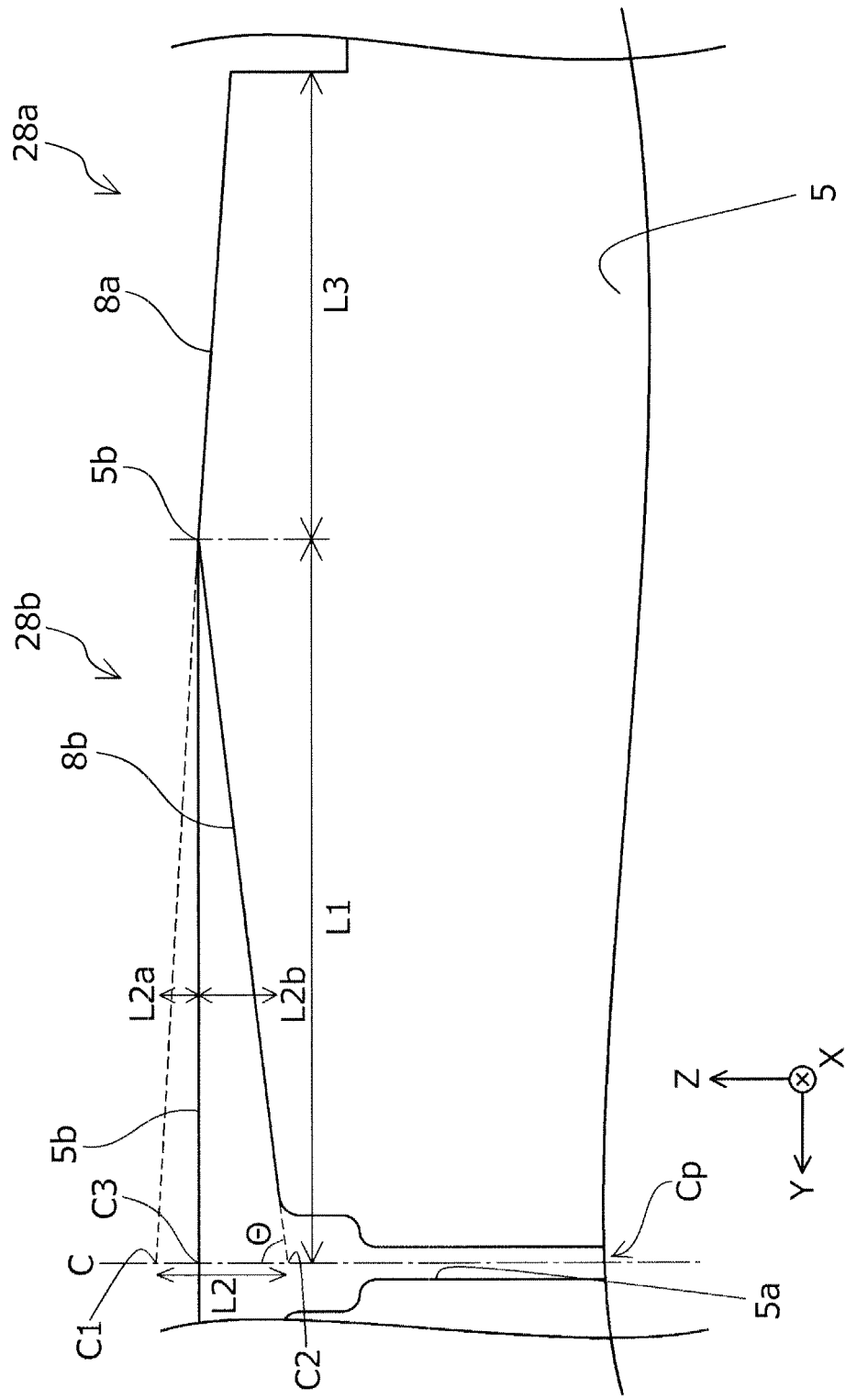
FIG. 7 is a schematic enlarged front view showing apart of the barrel of the three-dimensional shaping apparatus according to the first embodiment of the present disclosure.

(La represents a linear distance from an outer end portion of the groove forming surface 18 or the facing surface 8 in the horizontal direction to the rotation center C of the rotation axis, and corresponds to L1+L3 in FIG. 7. Lb represents a linear distance from the outer end portion to the boundary portion 5b in the horizontal direction, and corresponds to L3 in FIG. 7.)

That is, a ratio of a linear distance from an outer end portion where the screw 4 and the barrel 5 face each other in the horizontal direction to the boundary portion 5b between the first facing region 28a and the second facing region 28b with respect to a linear distance from the outer end portion where the screw 4 and the barrel 5 face each other in the horizontal direction to the rotation center C of the screw 4 is preferably 1/3 or more and 1/2.5 or less. This is because when the ratio is too large, it may be difficult to concentrate the material from the first facing region 28a to the second facing region 28b, when the ratio is too small, it may be difficult to concentrate the material toward the central portion Cp in the second facing region 28b, and such adverse effects can be prevented by setting the ratio to 1/3 or more and 1/2.5 or less.

Second Embodiment

Figure 8:
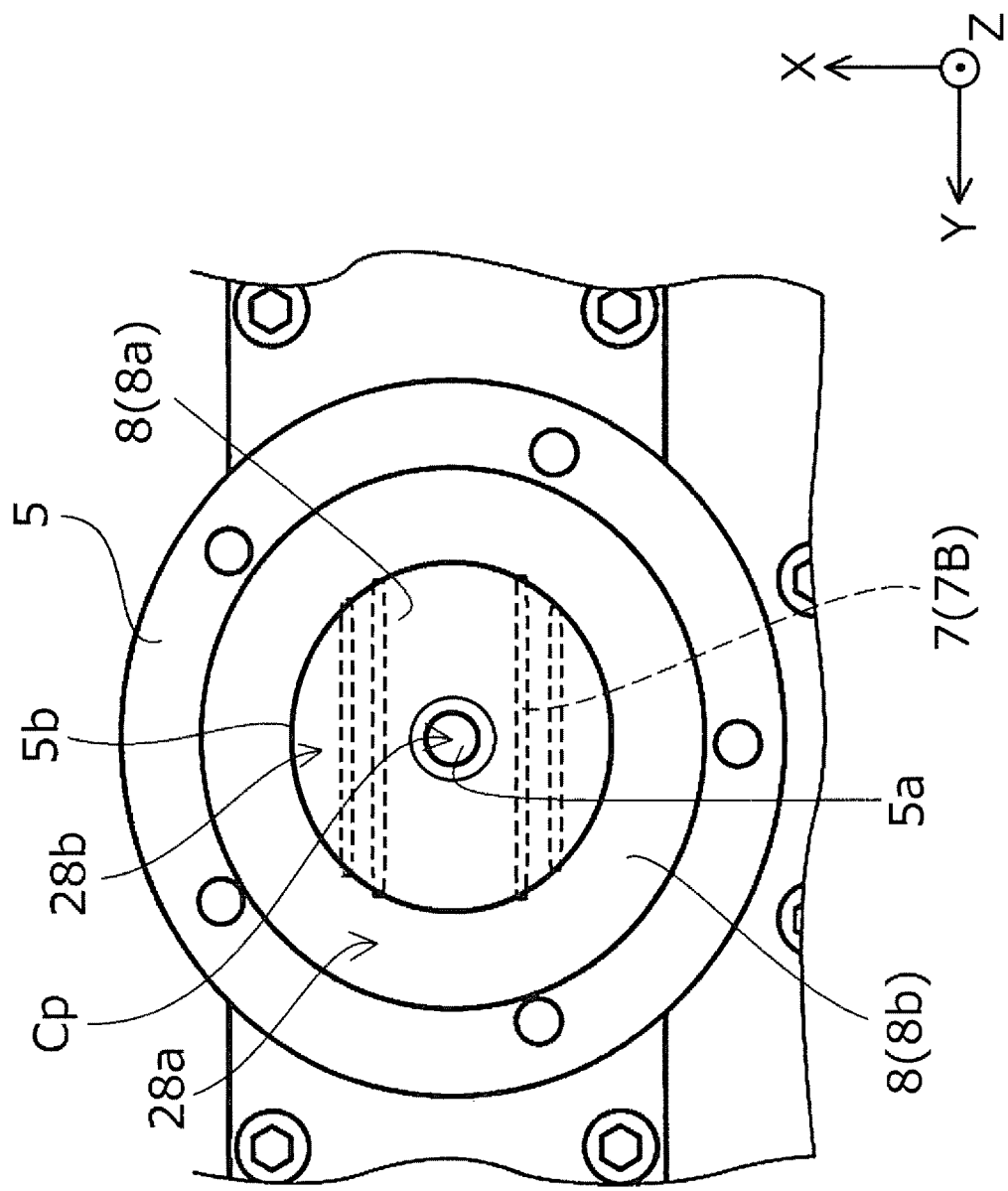
FIG. 8 is a schematic plan view showing a barrel of a three-dimensional shaping apparatus according to a second embodiment of the present disclosure.

Next, the plasticizing device 1 according to a second embodiment will be described with reference to FIG. 8. FIG. 8 is a diagram corresponding to FIG. 4 showing the plasticizing device 1 according to the first embodiment. Components same as those in the first embodiment are denoted by the same reference numerals in FIG. 8, and a detailed description is omitted. Here, the plasticizing device 1 according to the present embodiment has characteristics same as those of the plasticizing device 1 according to the first embodiment, and has a shape same as the shape of the plasticizing device 1 according to first embodiment except for those described below.

As shown in FIG. 8, the plasticizing device 1 according to the present embodiment includes four rod-like heaters 7B extending in the Y axis direction as the heating unit 7, instead of the circular heater 7A. As described above, the present disclosure can use heaters having various shapes as the heating unit 7.

Third Embodiment

Figure 9:
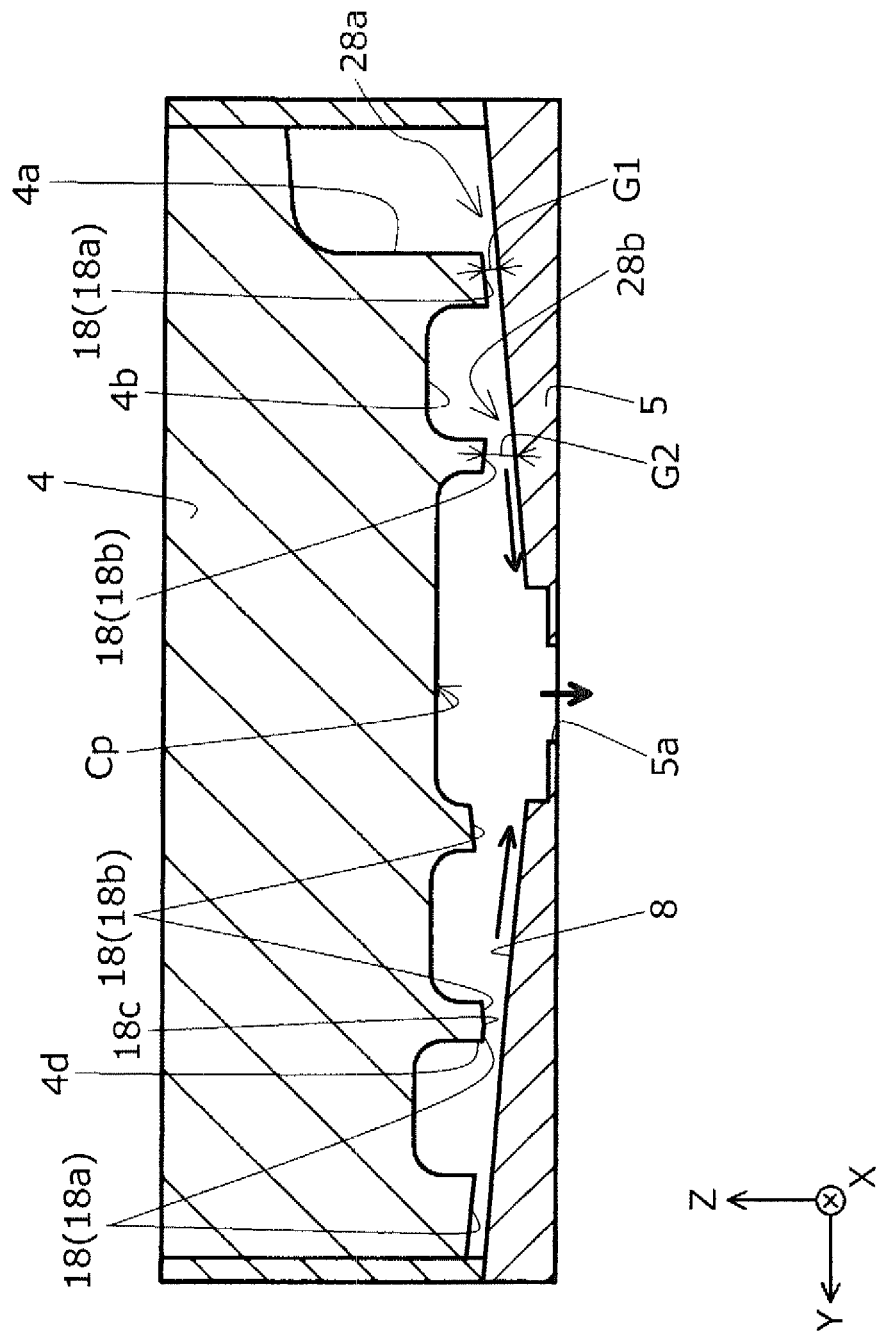
FIG. 9 is a schematic front view showing a screw and a barrel of a three-dimensional shaping apparatus according to a third embodiment of the present disclosure.

Next, the plasticizing device 1 according to a third embodiment will be described with reference to FIG. 9. FIG. 9 is a diagram corresponding to FIG. 5 showing the plasticizing device 1 according to the first embodiment. Components same as those in the first embodiment are denoted by the same reference numerals in FIG. 9, and a detailed description is omitted. Here, the plasticizing device 1 according to the present embodiment has characteristics same as those of the plasticizing device 1 according to the first embodiment, and has a shape same as the shape of the plasticizing device 1 according to first embodiment except for those described below.

As described above, in the plasticizing device 1 according to the first embodiment, the first facing region 28a and the second facing region 28b are formed by forming the first facing surface 8a and the second facing surface 8b on the facing surface 8. On the other hand, as shown in FIG. 9, in the plasticizing device 1 according to the present embodiment, the first facing region 28a and the second facing region 28b are formed by forming a first groove forming surface 18a and a second groove forming surface 18b on the groove forming surface 18. In other words, the groove forming surface 18 in the plasticizing device 1 according to the present embodiment has the first groove forming surface 18a located in the first facing region 28a and the second groove forming surface 18b that is located in the second facing region 28b and that has an inclination angle different from an inclination angle of the first groove forming surface 18a as viewed from the plane direction defined by the X axis and the Y axis.

In this manner, according to the present disclosure, the first facing region 28a and the second facing region 28b may be formed by forming the first facing surface 8a and the second facing surface 8b on the facing surface 8, or the first facing region 28a and the second facing region 28b may be formed by forming the first groove forming surface 18a and the second groove forming surface 18b on the groove forming surface 18. Further, the first facing region 28a and the second facing region 28b may be formed by forming the first facing surface 8a and the second facing surface 8b on the facing surface 8 and by forming the first groove forming surface 18a and the second groove forming surface 18b on the groove forming surface 18.

Injection Molding Machine

Figure 10:
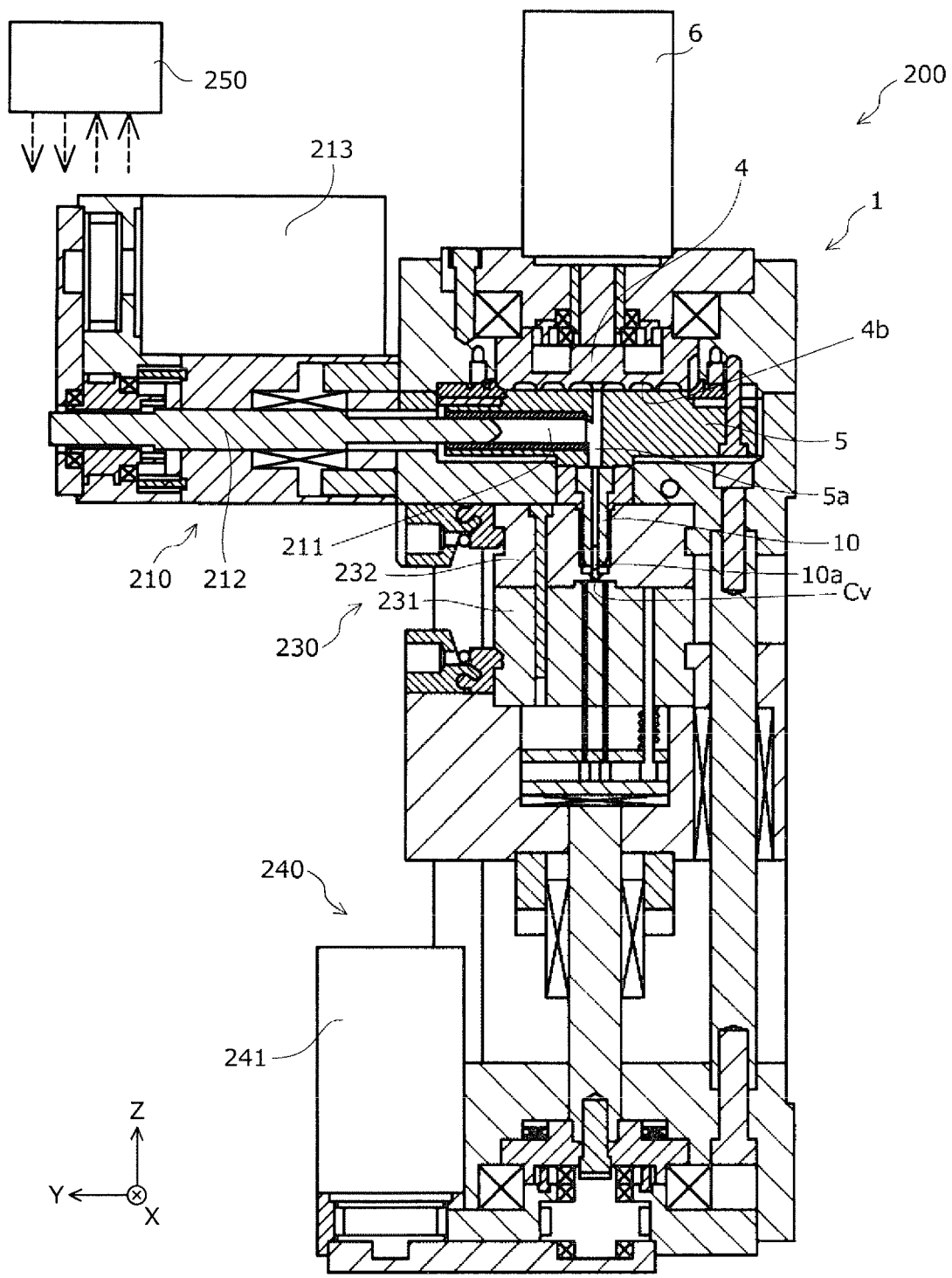
FIG. 10 is a schematic front view showing a configuration of an injection molding machine according to an embodiment of the present disclosure.

The plasticizing device according to the present disclosure, such as the plasticizing devices 1 according to the first embodiment to the third embodiment, can also be used in an apparatus other than the three-dimensional shaping apparatus 100. Hereinafter, an embodiment of an injection molding machine including the plasticizing device according to the present disclosure will be described with reference to FIG. 10.

An injection molding machine 200 according to the present embodiment includes the plasticizing device 1. The plasticizing device 1 includes the screw 4 having the groove forming surface 18 and the barrel 5 having the facing surface 8 as in the plasticizing device 1 according to the first embodiment. The injection molding machine 200 according to the present embodiment further includes an injection control mechanism. 210, a mold unit 230, and a mold clamping device 240.

The plasticizing device 1 includes the screw 4 and the barrel 5. As described above, specific configurations of the groove forming surface 18 of the screw 4 and the facing surface 8 of the barrel 5 are the same as those of the screw 4 and the barrel 5 according to the first embodiment. Under the control of a control unit 250, the plasticizing device 1 plasticizes at least apart of materials supplied to the groove 4b of the screw 4 to generate a paste-like melted material having flowability, and guides the melted material to the injection unit 10.

The injection control mechanism 210 includes an injection cylinder 211, a plunger 212, and a plunger drive unit 213. The injection control mechanism 210 has a function of injecting a melted material in the injection cylinder 211 into a cavity Cv to be described later. The injection control mechanism 210 controls an injection amount of the melted material from the nozzle 10a under the control of the control unit 250. The injection cylinder 211 is a substantially cylindrical member coupled to the communication hole 5a of the barrel 5, and is internally provided with the plunger 212. The plunger 212 is moved inside the injection cylinder 211, and pressure-feeds the melted material in the injection cylinder 211 to a nozzle 10a side. The plunger 212 is driven by the plunger drive unit 213 implemented by a motor.

The mold unit 230 includes a movable mold 231 and a fixed mold 232. The movable mold 231 and the fixed mold 232 are provided to face each other, and the cavity Cv that is a space corresponding to a shape of a molded product is provided between the movable mold 231 and the fixed mold 232. The melted material is pressure-fed by the injection control mechanism 210 into the cavity Cv and is injected via the nozzle 10a.

The mold clamping device 240 includes a mold drive unit 241 and has a function of opening and closing the movable mold 231 and the fixed mold 232. Under the control of the control unit 250, the mold clamping device 240 drives the mold drive unit 241 to move the movable mold 231 to open or close the mold unit 230.

Since the injection molding machine 200 according to the present embodiment is provided with the plasticizing device 1 that includes the screw 4 having the groove forming surface 18 and the barrel 5 having the facing surface 8 and is the same as the plasticizing device 1 according to the first embodiment, the melted material can be stably supplied from the plasticizing device 1. Therefore, the melted material can be stably injected from the nozzle 10a. Instead of the plasticizing device 1 that includes the screw 4 having the groove forming surface 18 and the barrel 5 having the facing surface 8 and is the same as the plasticizing device 1 according to the first embodiment, the injection molding machine 200 may be provided with the plasticizing device 1 that includes the screw 4 having the groove forming surface 18 and the barrel 5 having the facing surface 8 and is the same as the plasticizing device 1 according to the second embodiment or the third embodiment.

The present disclosure is not limited to the embodiments described above, and can be implemented in various configurations without departing from the scope of the disclosure. In order to solve some or all of problems described above, or to achieve some or all of effects described above, technical features in the embodiments corresponding to technical features in aspects described in the summary can be replaced or combined as appropriate. The technical features can be deleted as appropriate unless the technical features are described as essential in the present specification.

What is claimed is:

1. A plasticizing device that plasticizes a solid material, the plasticizing device comprising:
    a drive motor;
    a screw rotated around a rotation axis by the drive motor and having a groove forming surface in which a groove is formed, the groove being configured with a bottom, a wall, and a rib;
    a barrel having a facing surface facing the groove forming surface and provided with a communication hole in a central portion thereof; and
    a heater configured to heat at least one of the screw and the barrel, wherein
    a first facing region and a second facing region are provided between the groove forming surface and the facing surface, and the second facing region is closer to the rotation axis than the first facing region,
    a first gap is formed between a first tip of the rib and the facing surface in the first facing region, and a second gap is formed between a second tip of the rib and the facing surface in the second facing region,
    the second gap is larger than the first gap,
    the second gap becomes large toward the rotation axis, and
    in a cross section along the rotation axis,
        at least one of the groove forming surface and the facing surface corresponding to the first facing region is inclined at a first angle with respect to an intersecting direction perpendicular to the rotation axis,
        at least one of the groove forming surface and the facing surface corresponding to the second facing region is inclined at a second angle with respect to the intersecting direction, and
        the first angle and the second angle are different.

2. The plasticizing device according to claim 1, wherein the second angle is larger than 0° and is 5° or less.

3. The plasticizing device according to claim 1, wherein a boundary between the first facing region and the second facing region in the intersecting direction satisfies $$1/3 \leq Lb/La \leq 1/2.5,$$

wherein La represents a linear distance from an outer end portion of the groove forming surface or the facing surface to the rotation axis in the intersecting direction, and Lb represents a linear distance from the outer end portion to the boundary in the intersecting direction.

4. The plasticizing device according to claim 1, wherein the facing surface has a first facing surface located in the first facing region and a second facing surface located in the second facing region, and
the first facing surface is inclined at the first angle and the second facing surface is inclined at the second angle.

5. The plasticizing device according to claim 4, wherein in the cross section along the rotation axis, the first facing surface is an inclined surface on which the first gap becomes small toward the rotation axis and the second facing surface is an inclined surface on which the second gap becomes large toward the rotation axis.

6. The plasticizing device according to claim 1, wherein the groove forming surface has a first groove forming surface located in the first facing region and a second groove forming surface located in the second facing region, and
the first groove forming surface is inclined at the first angle and the second groove forming surface is inclined at the second angle.

7. The plasticizing device according to claim 1, wherein the screw has a protruding portion at the groove forming surface, and the protruding portion protrudes toward the communication hole of the barrel.

8. The plasticizing device according to claim 1, wherein the heater is a circular heater provided at a position overlapping the second facing region in a cross section perpendicular to the rotation axis.

9. An injection molding machine comprising:
the plasticizing device according to claim 1; and
an injection head configured to inject a material plasticized by the plasticizing device into a mold.

10. A three-dimensional shaping apparatus comprising:
the plasticizing device according to claim 1; and a discharge head configured to discharge a material plasticized by the plasticizing device toward a table to shape a three-dimensional shaped object on the table.

11. The plasticizing device according to claim 5, wherein the facing surface satisfies $L2/L1<1/9$, wherein L1 represents a linear distance from a boundary between the first facing surface and the second facing surface to the rotation axis in the intersecting direction, L2 represents a linear distance between a first virtual connection point and a second virtual connection point along the rotation axis, the first virtual connection point is a point connecting between the rotation axis and a first extending surface continuously extending from the first facing surface, and the second virtual connection point is a point connecting between the rotation axis and a second extending surface continuously extending from the second facing surface.

* * * * *